United States Patent
Parrella (10) Patent No.: US 8,534,069 B2
(45) Date of Patent: Sep. 17, 2013

(54) CONTROL SYSTEM TO MANAGE AND OPTIMIZE A GEOTHERMAL ELECTRIC GENERATION SYSTEM FROM ONE OR MORE WELLS THAT INDIVIDUALLY PRODUCE HEAT

(76) Inventor: Michael J. Parrella, Weston, CT (US)

( * ) Notice: Subject to any disclaimer, the term of this patent is extended or adjusted under 35 U.S.C. 154(b) by 512 days.

(21) Appl. No.: 12/462,656

(22) Filed: Aug. 5, 2009

(65) Prior Publication Data
US 2010/0269501 A1    Oct. 28, 2010

Related U.S. Application Data

(63) Continuation-in-part of application No. 12/456,434, filed on Jun. 15, 2009.

(60) Provisional application No. 61/137,956, filed on Aug. 5, 2008, provisional application No. 61/137,974, filed on Aug. 5, 2008, provisional application No. 61/137,955, filed on Aug. 5, 2008, provisional application No. 61/137,975, filed on Aug. 5, 2008.

(51) Int. Cl.
*F03G 7/00* (2006.01)
*F01K 7/40* (2006.01)

(52) U.S. Cl.
USPC ........................................... 60/641.2; 60/667

(58) Field of Classification Search
USPC ............... 60/641.1–641.5, 645–681
See application file for complete search history.

(56) References Cited

U.S. PATENT DOCUMENTS

| | | | |
|---|---|---|---|
| 3,220,470 A | 11/1965 | Balch | |
| 3,274,769 A | 9/1966 | Reynolds | |
| 3,628,923 A | 12/1971 | White | |
| 3,658,123 A | 4/1972 | Root | |
| 3,911,683 A | 10/1975 | Wolf | |
| 3,954,140 A | 5/1976 | Hendrick | |
| 3,988,896 A * | 11/1976 | Matthews | 60/641.4 |
| 4,051,677 A * | 10/1977 | Van Huisen | 60/641.2 |
| 4,060,988 A | 12/1977 | Arnold | |
| 4,094,356 A | 6/1978 | Ash et al. | |
| 4,117,344 A * | 9/1978 | Boerstler et al. | 290/52 |
| 4,255,936 A | 3/1981 | Cochran | |
| 4,277,946 A | 7/1981 | Bottum | |

(Continued)

FOREIGN PATENT DOCUMENTS

| | | |
|---|---|---|
| CN | 1206097 | 1/1999 |
| GE | 1800 | 10/1999 |

(Continued)

OTHER PUBLICATIONS

English language abstract for GE1800 (1 page), Oct. 5, 1999.

(Continued)

*Primary Examiner* — Kenneth Bomberg
*Assistant Examiner* — Christopher Jetton (57) ABSTRACT

A control system manages and optimizes a geothermal electric generation system from one or more wells that individually produce heat. The control system includes heat sensors that measure temperature and fluid flow and are placed at critical points in the wells, in piping, in a hot fluid reservoir, in a cold fluid reservoir and in a cooling system. The control system also includes pump and valve controls, generator controls, a network for gathering information and delivering instructions, and a processing module that collects information and communicates control information to each component.

22 Claims, 4 Drawing Sheets

(56) References Cited

U.S. PATENT DOCUMENTS

| | | | |
|---|---|---|---|
| 4,286,651 | A | 9/1981 | Steiger et al. |
| 4,392,531 | A | 7/1983 | Ippolito |
| 4,448,043 | A | 5/1984 | Aragou |
| 4,538,673 | A | 9/1985 | Partin et al. |
| 4,714,108 | A | 12/1987 | Barry |
| 4,854,372 | A | 8/1989 | Sakaya et al. |
| 4,912,941 | A * | 4/1990 | Buchi ............................ 62/260 |
| 5,081,848 | A | 1/1992 | Rawlings et al. |
| 5,272,879 | A | 12/1993 | Wiggs |
| 5,442,906 | A | 8/1995 | Broadus |
| 5,497,624 | A * | 3/1996 | Amir et al. .................. 60/641.5 |
| 5,536,310 | A | 7/1996 | Brook et al. |
| 5,564,282 | A | 10/1996 | Kaye |
| 5,613,452 | A | 3/1997 | Marchesi et al. |
| 5,626,647 | A | 5/1997 | Kohr |
| 5,911,897 | A | 6/1999 | Hamilton |
| 6,251,179 | B1 | 6/2001 | Allan |
| 6,502,636 | B2 | 1/2003 | Chatterji et al. |
| 6,668,573 | B1 | 12/2003 | Gilsdorf |
| 6,694,757 | B1 | 2/2004 | Backman |
| 6,789,608 | B1 | 9/2004 | Wiggs |
| 7,067,004 | B2 | 6/2006 | Matula et al. |
| 7,452,417 | B2 | 11/2008 | Matula et al. |
| 7,753,122 | B2 | 7/2010 | Curlett |
| 7,856,839 | B2 | 12/2010 | Wiggs |
| 7,938,904 | B1 | 5/2011 | Wiggs |
| 8,003,844 | B2 | 8/2011 | Dana et al. |
| 2003/0051639 | A1 | 3/2003 | Dams et al. |
| 2003/0056936 | A1 | 3/2003 | Lindemuth et al. |
| 2006/0249276 | A1 | 11/2006 | Spadafora et al. |
| 2007/0187078 | A1 | 8/2007 | Greaney et al. |
| 2007/0223999 | A1 | 9/2007 | Curlett |
| 2007/0284107 | A1 | 12/2007 | Crichlow |
| 2008/0073248 | A1 | 3/2008 | Shah et al. |
| 2008/0245068 | A1 | 10/2008 | Bastawros et al. |
| 2008/0289334 | A1 | 11/2008 | Orosz et al. |
| 2009/0320475 | A1 | 12/2009 | Parrella |
| 2010/0269501 | A1 | 10/2010 | Parrella |
| 2010/0300092 | A1 | 12/2010 | Eli et al. |
| 2011/0011558 | A1 | 1/2011 | Dorrian et al. |

FOREIGN PATENT DOCUMENTS

| | | |
|---|---|---|
| JP | S49-124646 | 11/1974 |
| JP | S57-12571 | 1/1982 |
| JP | 59003178 | 1/1984 |
| JP | S61-79942 | 4/1986 |
| JP | 8284106 | 10/1996 |
| JP | 2001081712 | 3/2001 |
| JP | 2003-148079 | 5/2003 |
| JP | 2004052385 | 2/2004 |
| JP | 2004169985 | 6/2004 |
| JP | 2007177490 | 7/2007 |
| JP | 2008088652 | 4/2008 |
| KR | 1020050034535 | 4/2005 |
| KR | 1020060021023 | 3/2006 |
| RU | 2004889 | 12/1993 |
| RU | 2096696 | 11/1997 |
| RU | 2115868 | 7/1998 |
| RU | 2260751 | 9/2005 |
| SU | 1730439 | 4/1992 |
| SU | 1749497 | 7/1992 |

OTHER PUBLICATIONS

English language abstract for RU2260751 (1 page), Oct. 27, 2004.
English language abstract for RU2115868 (1 page), Jul. 20, 1998.
English language abstract for RU2096696 (1 page), Nov. 20, 1997.
English language abstract for RU2004889 (1 page), Dec. 15, 1993.
English language abstract for SU1749497 (1 page), Jul. 23, 1992.
English language abstract for SU1730439 (1 page), Apr. 30, 1992.
*Large Titanium Heat Exchangers Design, Manufacture, and Fabrication Issues*, L. Bower, Joseph Oat Corporation, J. Banker, DMC Clad Metal, Corrosion Solutions Conference 2003, Wah Chang, Sep. 2003, 13 pages.
ThermoPEX™, Central Boiler, Inc., 2052 150$^{th}$ Street, Greenbush, MN 56726, Dec. 2005.
*High-Pressure Flexible Pipe, the next frontier*, J. Remery, S. Groves, H. Morand, A. Felix-Henry, D. Percy, J. Day, www.offshore-mag.com, vol. 67, Issue 5, May 2007, 5 pages.
Technip Flexible Pipe, Technologies and products, 12 pages, Dec. 2007.
*Development of a Flexible Pipe for Pipe-in-Pipe Technology*, T. Kagoura, K. Ishii, S. Abe, T. Inoue, T. Hayashi, T. Sakamoto, T. Mochizuki and T. Yamada, Furukawa Review No. 24, 2003, pp. 69-74.
English language abstract of JP2008088652 (2 pages), Apr. 17, 2008.
English language abstract of JP2007177490 (2 pages), Jul. 12, 2007.
English language abstract of JP2004052385 (2 pages), Feb. 19, 2004.
English language abstract of JP2001081712 (2 pages), Mar. 27, 2001.
English language abstract of CN1206097 (1 page), Jan. 27, 1999.
English language abstract of JP8284106 (1 page), Oct. 29, 1996.
International Search Report dated Sep. 7, 2012, 1 page.
2 pages PCT International Search Report PCT/US2009/004517 date of mailing Apr. 6, 2010.
3 pages PCT International Search Report PCT/US2009/004515 date of mailing Feb. 3, 2010.
4 pages PCT International Search Report PCT/US2009/004518 date of mailing Apr. 6, 2010; including 1st page of Publication WO 2010/016921 A3.
3 pages PCT International Search Report PCT/US2009/004516 date of mailing Apr. 2, 2010; including 1st page of Publication WO 2010/016920 A3.
JP2004169985 English Language Abstract, Jun. 7, 2004.
KR1020050034535 English Language Abstract, Apr. 14, 2005.
KR1020060021023 English Language Abstract, Jun. 7, 2004.
JP59003178 English Language Abstract, Jun. 7, 2004.

* cited by examiner

CONTROL SYSTEM TO MANAGE AND OPTIMIZE A GEOTHERMAL ELECTRIC GENERATION SYSTEM FROM ONE OR MORE WELLS THAT INDIVIDUALLY PRODUCE HEAT

CROSS REFERENCE TO RELATED APPLICATIONS

This application is a continuation-in-part of U.S. Non-Provisional patent application Ser. No. 12/456,434 filed on Jun. 15, 2009. This application also claims priority to 1) U.S. Provisional Application No. 61/137,956, filed on Aug. 5, 2008; 2) U.S. Provisional Application No. 61/137,974, filed on Aug. 5, 2008; 3) U.S. Provisional Application No. 61/137,955, filed on Aug. 5, 2008; and 4) U.S. Provisional Application No. 61/137,975, filed on Aug. 5, 2008, the contents of all of which are hereby incorporated in their entirety.

STATEMENT REGARDING FEDERALLY-SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates generally to the field of converting geothermal energy into electricity. More specifically, the present invention relates to capturing geothermal heat from deep within a drilled well and bringing this geothermal heat to the Earth's surface to generate electricity in an environmentally friendly process.

Wells that have been drilled for oil and gas exploration that are either depleted, or have never produced oil or gas, usually remain abandoned and/or unused and may eventually be filled. Such wells were created at a large cost and create an environmental issue when no longer needed for their initial use.

Wells may also be drilled specifically to produce heat. While there are known geothermal heat/electrical methods and systems for using the geothermal heat/energy from deep within a well (in order to produce a heated fluid (liquid or gas) and generate electricity therefrom), these methods have significant environmental drawbacks and are usually inefficient in oil and gas wells due to the depth of such wells.

More specifically, geothermal heat pump (GHP) systems and enhanced geothermal systems (EGS) are well known systems in the prior art for recovering energy from the Earth. In GHP systems, geothermal heat from the Earth is used to heat a fluid, such as water, which is then used for heating and cooling. The fluid, usually water, is actually heated to a point where it is converted into steam in a process called flash steam conversion, which is then used to generate electricity. These systems use existing or man made water reservoirs to carry the heat from deep wells to the surface. The water used for these systems is extremely harmful to the environment, as it is full of minerals, is caustic and can pollute water aquifers. Such deep-well implementations require that a brine reservoir exists or that a reservoir is built by injecting huge quantities of water into an injection well, effectively requiring the use of at least two wells. Both methods require that polluted dirty water is brought to the surface. In the case of EGS systems, water injected into a well permeates the Earth as it travels over rock and other material under the Earth's surface, becoming polluted, caustic, and dangerous.

A water-based system for generating heat from a well presents significant and specific issues. For example, extremely large quantities of water are often injected into a well. This water is heated and flows around the inside of the well to become heated and is then extracted from the well to generate electricity. This water becomes polluted with minerals and other harmful substances, often is very caustic, and causes problems such as seismic instability and disturbance of natural hydrothermal manifestations. Additionally, there is a high potential for pollution of surrounding aquifers. This polluted water causes additional problems, such as depositing minerals and severely scaling pipes.

Geothermal energy is present everywhere beneath the Earth's surface. In general, the temperature of the Earth increases with increasing depth, from 400°-1800° F. at the base of the Earth's crust to an estimated temperature of 6300°-8100° F. at the center of the Earth. However, in order to be useful as a source of energy, it must be accessible to drilled wells. This increases the cost of drilling associated with geothermal systems, and the cost increases with increasing depth.

In a conventional geothermal system, such as for example and enhanced geothermal system (EGS), water or a fluid (a liquid or gas), is pumped into a well using a pump and piping system. The water then travels over hot rock to a production well and the hot, dirty water or fluid is transferred to the surface to generate electricity.

As mentioned earlier herein, the fluid (water) may actually be heated to the point where it is converted into gas/steam. The heated fluid or gas/steam then travels to the surface up and out of the well. When it reaches the surface, the heated water and/or the gas/steam is used to power a thermal engine (electric turbine and generator) which converts the thermal energy from the heated water or gas/steam into electricity.

This type of conventional geothermal system is highly inefficient in very deep wells for several of reasons. First, in order to generate a heated fluid required to efficiently operate several thermal engines (electric turbines and generators), the fluid must be heated to degrees of anywhere between 190° F. and 1000° F. Therefore the fluid must obtain heat from the surrounding hot rock. As it picks up heat it also picks up minerals, salt, and acidity, causing it to very caustic. In order to reach such desired temperatures in areas that lack a shallow-depth geothermal heat source (i.e. in order to heat the fluid to this desired temperature), the well used must be very deep. In this type of prior art system, the geologies that can be used because of the need for large quantities of water are very limited.

The deeper the well, the more challenging it is to implement a water-based system. Moreover, as the well becomes deeper the gas or fluid must travel further to reach the surface, allowing more heat to dissipate. Therefore, using conventional geothermal electricity-generating systems can be highly inefficient because long lengths between the bottom of a well and the surface results in the loss of heat more quickly. This heat loss impacts the efficacy and economics of generating electricity from these types of systems. Even more water is required in such deep wells, making geothermal electricity-generating systems challenging in deep wells.

Accordingly, prior art geothermal systems include a pump, a piping system buried in the ground, an above ground heat transfer device and tremendous quantities of water that circulates through the Earth to pick up heat from the Earth's hot rock. The ground is used as a heat source to heat the circulating water. An important factor in determining the feasibility of such a prior art geothermal system is the depth of wellbore, which affects the drilling costs, the cost of the pipe and the size of the pump. If the wellbore has to be drilled to too great a depth, a water-based geothermal system may not be a practical alternative energy source. Furthermore, these water-based systems often fail due to a lack of permeability of hot rock within the Earth, as water injected into the well never reaches the production well that retrieves the water.

BRIEF SUMMARY OF THE INVENTION

Wells that have been drilled for oil and gas exploration that are either depleted, or have never produced oil or gas, can now be used to generate electricity. A well can also be drilled specifically for the purpose of generating electricity. The only requirement is that the well is deep enough to generate heat from the bottom of the well. The invention I a control system for optimizing and operating is a process for economically conducting the heat from a well to the surface and then using the heat to generate electricity.

By using the control system to aggregate multiple single well systems power plants generating megawatts of electricity can be constructed.

To control and maximize the performance of one or more wells and generators that have been modified and designed to produce heat for the generation of electricity and have been aggregated to form a power plant. a Central Control System is used. The system is required to coordinate and operate one or more wells.

The fluid flow rates of the wells and generation equipment need to be controlled so that they are coordinated, and maximized. All critical elements need to be measured and all generators pumps, valves and generators in the system need to be controlled.

A single Central Control System that adjusts the pumps, valves and generators based on information from all the measurement points allows the system to self adjust all flow and heat issues coordinating, controlling and maximizing the system results. The control system also controls all the functions of generating electricity.

Other embodiments, features and advantages of the present invention will become more apparent from the following description of the embodiments, taken together with the accompanying several views of the drawings, which illustrate, by way of example, the principles of the invention.

DETAILED DESCRIPTION OF THE INVENTION

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
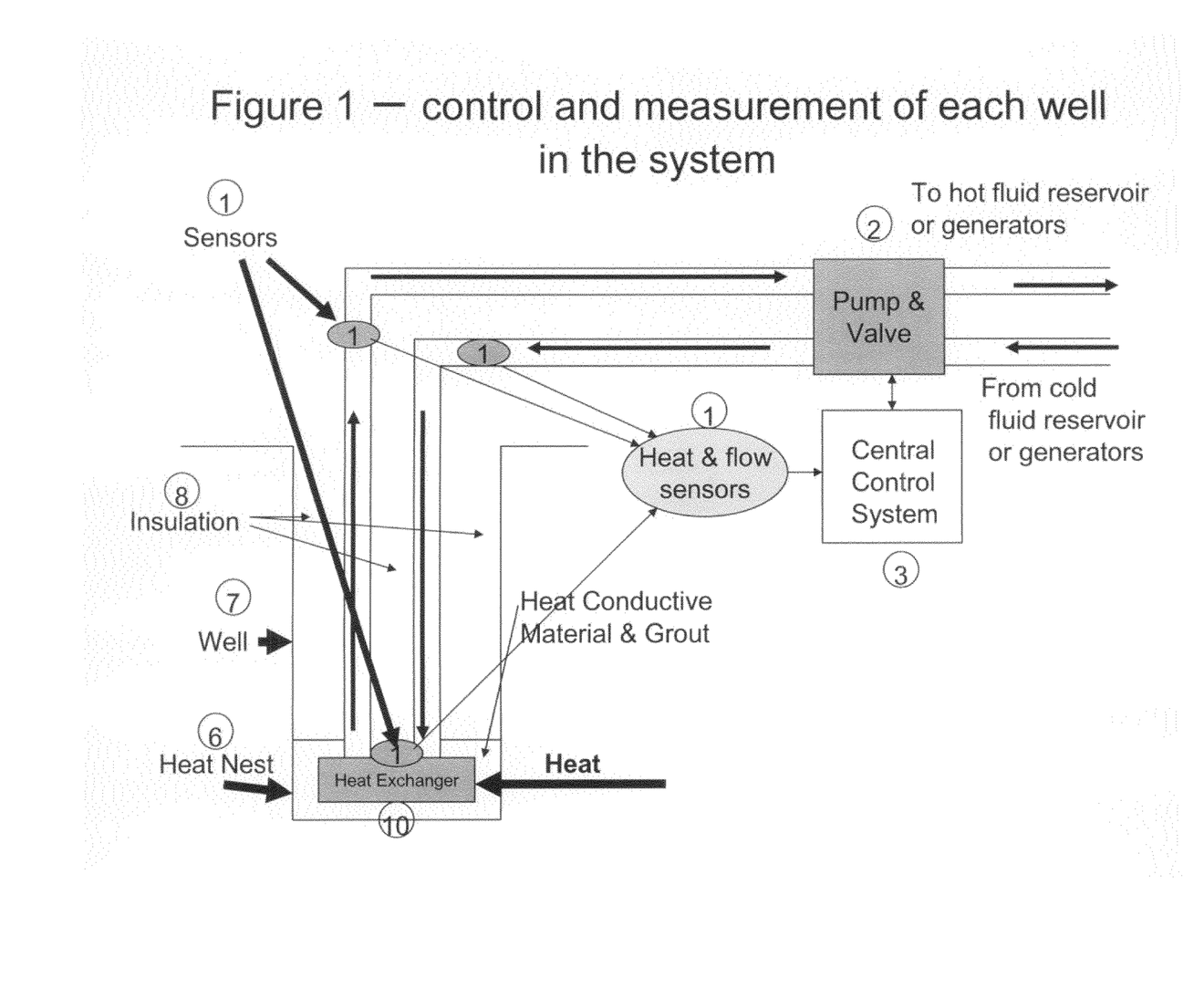
FIG. 1 is a conceptual view of a system according to one embodiment of the present invention showing a single closed loop having a heat harnessing component and an electricity generating component.

FIG. 1 illustrates a first preferred embodiment of the control system for a single well system 7 of the present invention, wherein said system is comprised of a single closed loop having a heat harnessing component and an electricity generating component. Fluid is pumped 2 down the well in a closed loop to a heat nest that contains a heat exchanger. The heat exchanger transfers the heat at the bottom of the well tot the fluid. The fluid carries the heat to the surface and then to a hot fluid reservoir or to an electric generation component. The Control System using heat sensors 1 and the flow information from the pups and valves 2, measures the heat at the bottom and top of the well and the gallons per minute being extracted from the well. Using the information from the sensors, pumps and valves the control system sends signals to the pumps and valves controlling the gallons per minute flowing down the well. By controlling the flows the control system can control the heat extracted per minute from the well. If the control system can also rest a well by returning the fluid immediately back down the well. The control system can also converge to heat equilibrium which is the point where if you increase the gallons per minute the temperature drops.

Figure 2:
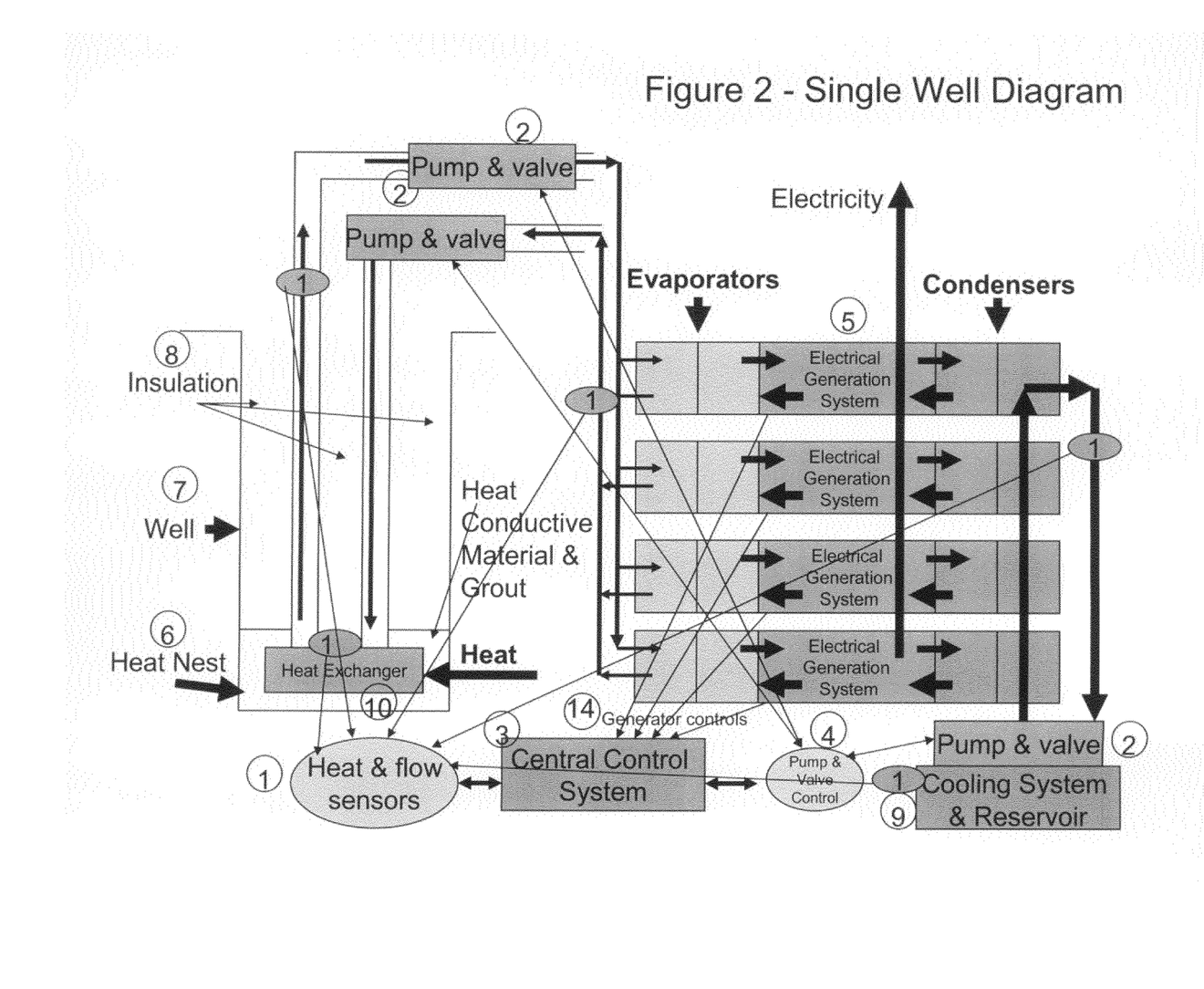
FIG. 2 is a conceptual view of a system according to another embodiment of the present invention showing the control system and extension of the measurements and control to include the control of the generation and cooling components.
Figure 3:
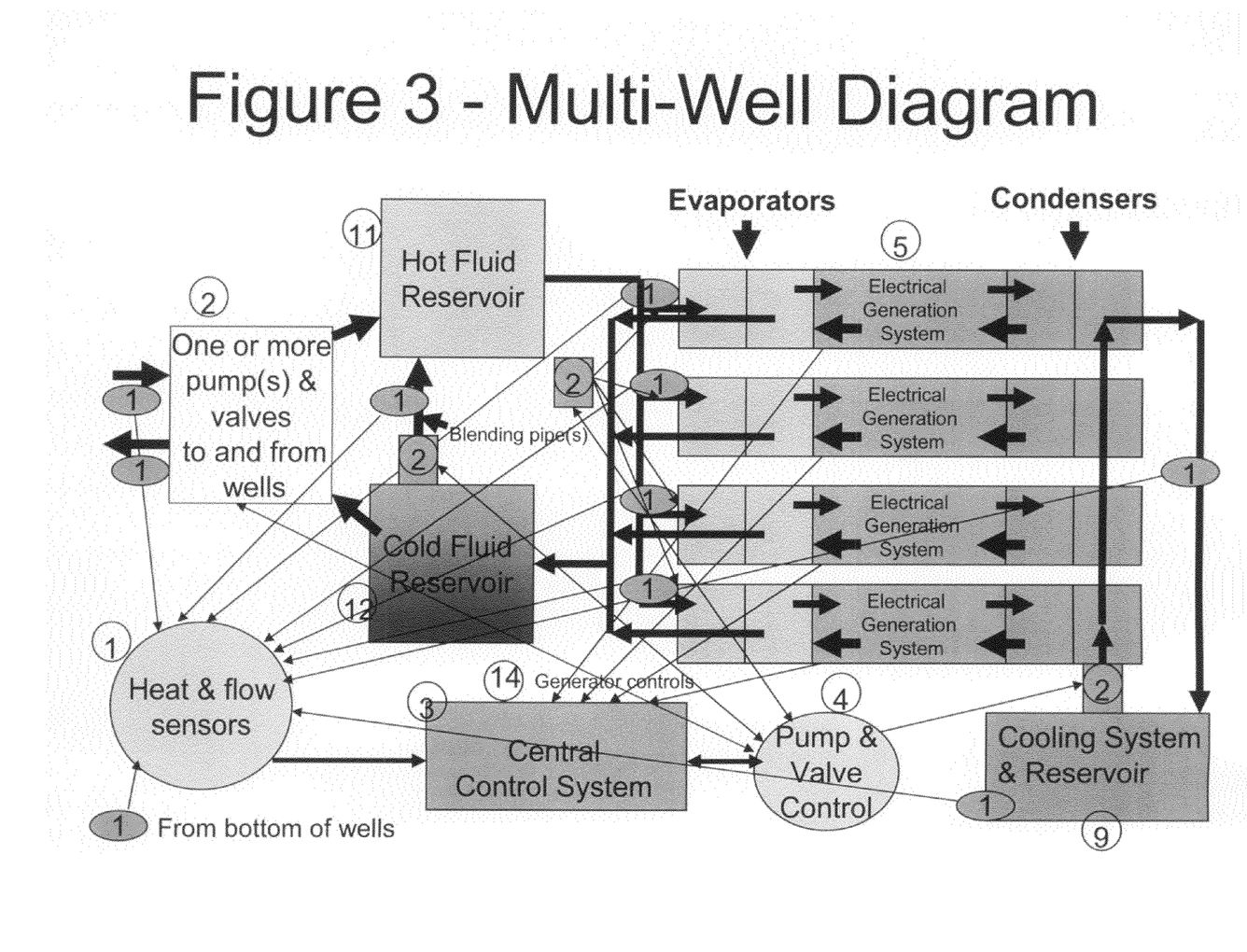
FIG. 3 is a conceptual view of a system according to another embodiment of the present invention showing the control system and extension of the measurements and control to include the control of multiple wells by adding a hot fluid reservoir and a cold fluid reservoir plus cooling components.
Figure 4:
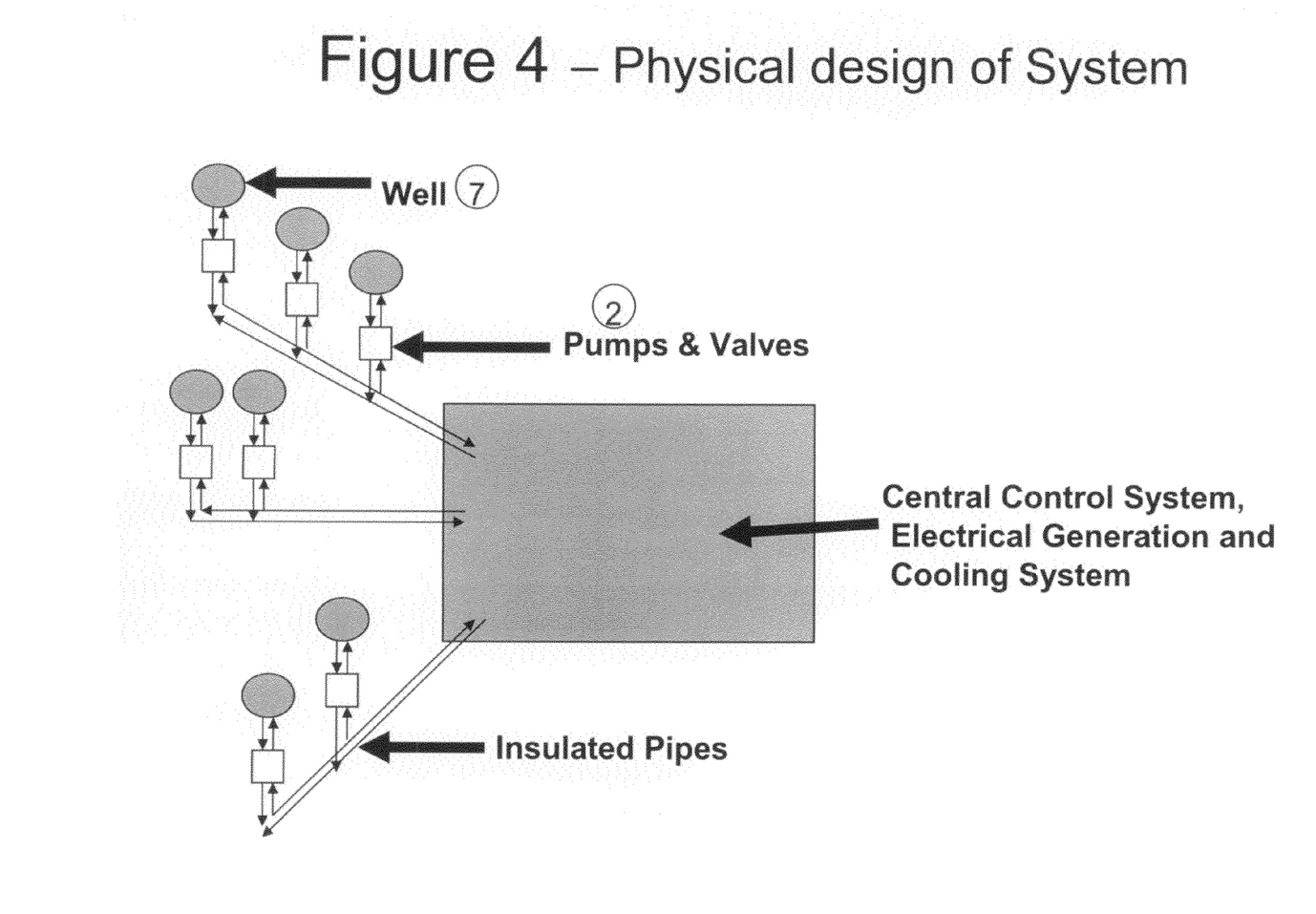
FIG. 4 is a conceptual view of a system according to another embodiment of the present invention showing multiple wells are connected to a single plant housing the control system, the generators and the cooling system.

FIG. 2 illustrates a second preferred embodiment for the control system 3, and extends the measurements and control to include the control of the generation and cooling components. For this example the well can support four generators 5, the number of heat and flow sensors 1 is increased to five (5), the number of pump and valves 4 to three (3) and the generator controls 14 to four (4). This would allow the central control system to control the heat from one well and run four generators 5;

FIG. 3 illustrates a third preferred embodiment for the control system 3, and extends the measurements and control to include the control of multiple wells by adding a hot fluid reservoir 11 and a cold fluid reservoir 12 plus cooling components 9. For this example each well would have three (3) heat and flow sensors 1, each generator would have a heat and flow sensor from the hot fluid reservoir, there would be a heat and flow sensor for the blending pipe(s) connecting the cold fluid reservoir to the hot fluid reservoir and one or more heat and flow sensors for the cooling system 9. For this example there are two pumps and valves 2 for each well, there is a pump and valve for each generator, there is a pump and valve for the blender pipe(s) and there are pumps and valves for the cooling system 9. The central control system 3 measures the temperatures and flows and adjusts them dynamically to maximize the generation of electricity while maintaining the proper heat extraction from each well;

FIG. 4 illustrates an embodiment where multiple wells are connected to a single plant housing the control system, the generators and the cooling system. A set of pumps and valves and heat and flow sensors are installed at each well. Each well is attached to a piping system that brings the hot fluid to the plant and the cold fluid back to the wells. The control system balances all flows by measuring the flows and temperature and managing the valves and pumps. This design minimizes piping and heat loss from the wells to the electrical generation plant.

The control system invention is designed to manage, control and maximize the operations of one or more wells that are single well closed looped geothermal heat extraction systems for the generation of electricity. The single wells 7 are designed to use hot rock as a source of heat. If the heat is transferred from the hot rock faster than the hot rock heat can be replenished the heat from the well fails and it takes time for the rock to replenish. One of the primary functions of the control system is to make sure heat is extracted from each well at or below its heat equilibrium rate. Heat equilibrium is the point where the heat extracted from the hot rock equals the heat replenishment rate of the hot rock. By running the system at or below heat equilibrium the well can sustain its heat supply indefinitely. If the environment changes and cause a change in the equilibrium the control system can detect this and automatically adjust the flows.

The second function of the control system is to manage the hot fluid reservoir 11. Each of the wells will deliver different gallons per minute at different temperatures (based on their heat equilibrium) that combine to create a total input to the hot fluid reservoir. The wells were designed to deliver more than enough heat to generate electricity. If the total heat input to the hot fluid reservoir is higher than the generators need to operate, fluid from the cold fluid reservoir can be blended in creating a larger heat flow thereby allowing more generators to operate. The measuring and controlling of this process is done by the central control system.

The central control system controls the operations of all generators. By measuring all significant data measurements the central control system can turn generators off or on and can regulate the hot fluid sent to each generator. If any faults are discovered the generator can be taken off-line.

The central control system also controls the fluid flows, of the cooling system 9. It measures the cold and makes sure there is enough flow to the generators to meet the heat and makes sure that the heat differential between the hot fluid and the cold fluid is properly maintained.

By measuring the fluid flow throughout the system the central control system can detect any failures or leaks and shut down the appropriate wells, devices etc.

An electrical plant is built to handle peak electrical requirements. Peak occurs at certain times of the year when the electrical draws are at maximum. There is also a peak electrical draw each day. When the electrical demand is not at peak some of the generators can be cycled off-line. As the generators are taken off line some of the wells can be rested. A well is rested by directing the valve at the well to send the heated fluid back down the well as soon as it reaches the valve at the surface. By cycling the heated fluid back down the well the hot rock is not transferring heat to the heat exchanger and is not being depleted. The central control system rests the various wells in cycles so that all the wells get a chance to rest off-peak.

By building a Central Control System 3 and the electrical generation units 5 at the center of a field of wells (many wells FIG. 5) you minimize the distance fluids need to travel and minimize heat loss. By measuring all critical data with sensors 1 that measure temperature and fluid flow by controlling pumps, valves and generators, the central control system can control the system and maximize performance.

Example: If you need 300 degrees F. and one well is producing 400 degrees and the other 200 degrees you can pump the right amounts from each well to achieve 300 degrees.

You can take wells off line for maintenance and repair by turning off the well pumps and/or adjusting valves and adjusting the other system flows.

By installing pump and valves 2 at each well you can link wells together and attach the remote pumps to the control system and minimize well distances.

The wells attached to each line can be individually controlled as to fluid flow and temperature mixes.

The heat that can be transferred from a well is impacted by the speed at which the fluid is pumped through the heat exchanger 10. The slower the speed the more time the heat has to transfer to the fluid. The system measures the heat at the heat exchanger and at the top of the well and adjusts the fluid flow rate to minimize the difference between the measurements and to reach a specified result.

Difference=Heat Exchanger Heat−Top Heat

If the heat exchanger heat is 400 degrees and the pump rate is 180 gallons per minute achieving 390 degrees at the top and the generator requires 180 gallons per minute at 300 degrees, then the system can pump more gallons per minute until the top temperature reaches 300 degrees therefore driving more generators. The Central Control System 3 measures and controls these relationships.

For multiple well systems all pumps from the wells feed a hot fluid reservoir 11 under control of the Central Control System. The hot fluids once cooled by the Generator 5 are returned into a cold fluid reservoir 12 for redistribution to the wells for heating under management of the Central Control System 3. If the heat from the wells is hotter then the heat required by the generators 5 the Central Control System can blend fluid from the cold fluid reservoir 12 to the hot fluid reservoir 11 to attain the optimum temperature and maximum flow.

An example of the heat flow required for the power generation is 260 degrees F. at 180 gallons per minute. If a well is producing 300 degrees F. at 120 gallons per minute the Central Control System can blend in fluid from the Cold Fluid Reservoir that has a fluid heat of 180 degrees F. to achieve the flow rate and temperature.

The formulas are:

Gallons from Cold Fluid Reservoir=180 gallons= 120 gallons@400+60 gallons@ 180

Temp=120/180*300+60/180*180

Temp=200+60

Temp=260

The Central Control System will maintain the pump rate of the flow from the well and increase the pump rate from the cold fluid reservoir until a temperature of 260 degrees F. is reached. This blending doubles the number of electric generators that can be used.

Most electric generation systems work on the principal of temperature change or the ΔT (temperature difference) between the evaporated fluid and the condensed fluid within the closed loop for power generation 5. The most efficient system is to have a single Cooling System for the collection of electric generation modules in the central installation. The Central Control System can then modulate the flow of cooling fluid from the cooling reservoir 9 to each of the generation modules adjusting the flows so that the proper ΔT is maintained.

If there is a fluid source available for cooling (ocean, lake, river or, well) the cold fluid can be pumped into the system and then returned back to the environment at a slightly higher temperature. As an example, on an oil platform the system can use cold sea water pumped from a pipe in the ocean this becomes the Cooling System Reservoir. Once the sea water exits the water is returned to the ocean.

If there is not an available cold fluid source then a Cooling System Reservoir needs to be maintained and the fluid leaving the condenser needs to be cooled so that it can be re-used. This cooling can be accomplished by using a standard cooling tower. Based on the number of electric generator systems that are being served the proper sized cooling tower(s) needs to be installed. The cooling tower(s) act as the Cooling System Reservoir.

A control system operates, manages and maximizes the conversion of heat to electricity from one or more individual geothermal wells that consists of heat sensors (measures temperature and fluid flow) placed at critical points in the wells, in the piping for the closed loop generating system, in the hot fluid reservoir, in the cold fluid reservoir and in the cooling system for a geothermal electric generation plant, pump and valve controls attached to the pumps and valves placed in appropriate locations in the hot fluid closed loop piping system and in the cooling system, generator controls attached to each generator in the system, a network for gathering information and delivering instructions to the heat sensors, pumps, valves and generators, and a processing module that collects the information from the heat sensors, pumps, valves and generators and by using a system of rules and computations sends control information to each component thereby controlling the total system.

Each well's the equilibrium rate is attained by using the information from a heat sensor at the bottom of the heat nest and a heat sensor at the top of the heat nest and pump and valve control information that is sent to the control system and the control system sends control information for one or more pumps attached to the well instructing the pumps to pump fluid into and out of the well at a certain rate. The fluid pumping rate determines the amount of heat being extracted from the well. When this fluid rate reaches heat equilibrium or the rule for running the wells under heat equilibrium the control system stops increasing the pumping rate. Heat equilibrium is the point where the heat extracted from the hot rock equals the heat replenishment rate of the hot rock. Each well should be operated at or below heat equilibrium. If conditions change the control system automatically adjusts the pump rates.

The heat sensors, valve and pump controls optimize the hot fluid reservoir for power generation by measuring the temperature and fluid flows from all the wells attached to the hot fluid reservoir and adjusting the total capacity by blending into the hot fluid reservoir fluid from the cold fluid reservoir. Each well pumps fluid at a rate and temperature that is determined by its equilibrium rate. Therefore the heat of the hot fluid reservoir is a mixture of the heat from all the wells. The temperature required for a generator to generate electricity is generally lower than the temperature in the hot fluid reservoir. By blending in fluid from the cold fluid reservoir into the hot fluid reservoir, increasing the total flow capacity, so that the hot fluid reservoir reaches the temperature required by the generators more generators can be activated thereby creating more electricity.

The heat sensors, valve and pump control information from the cooling system are used to maintain the temperature differential between the hot fluid and the cooling system fluid. By using the information from the sensors the control system can send control information to the pumps and valves so enough cold fluid can be supplied to maintain the temperature differential.

The temperature of the fluid in the cold fluid reservoir is high enough to activate generators. The cold fluid reservoir becomes a hot fluid reservoir for another set of generators thereby cascading the systems activating more generators and generating more electricity. Although the temperature is lower the required heat can be obtained by increasing the flow rates. This means that the number of generators the cascaded system can support will be less than the original system but the total electricity from both systems will be increased. The cascaded system runs under the control of the central control system. Any blending of the fluids for both systems comes from the cold fluid reservoir of the cascaded system.

One or more wells can be taken off-line and rested by cycling the fluid coming up from the well immediately back down the well. When the total electrical out put of the system is not required (off-peak operations) one or more of the wells can be rested. This allows the hot rock to stop transferring heat and the resting well stops removing heat from the earth. Once the well is back online the well will again start transferring heat for electrical generation. The central control system through a set of rules will cycle through the wells allowing a different set of wells to rest each time the total electrical output is not required.

One or more wells can be taken off-line and rested by cycling the fluid coming up from the well immediately back down the well.

A geothermal plant can be designed where there are more wells than are required for full operation of the generators. In this situation there are always wells that can be rested and the control system schedules the resting wells by cycling through the well inventory according to predefined rules. This allows the hot rock to stop transferring heat and the resting well stops removing heat from the earth. Once the well is back online the well will again start transferring heat for electrical generation.

The information obtained from the heat sensors, the pumps, the valves and the generators is used for operations, maintenance and fault detection. The central control system can detect fluid leaks, valve problems, pump problems and generator problems by continuously monitoring the data. When any component needs repair the central control system can take the component off-line and schedule maintenance. The central control system allows an entire plant to be monitored and controlled from a single point.

The network may be an analog network or a digital (TCPIP) network. Each component in the system has an address and can be polled for information, and may be displayed on an informational monitor establishing a visual user interface. Users communicate with the central control system using all the features available to a personal computer interface including but not limited to keyboards, mouse, voice recognition, touch screen, stylus, hand held controllers, and cell phones.

The central control system communicates remotely with a control system that can have a higher authority. The remote control system can override all rules and operations of the local central control system and an also serve as a backup if the local central control system fails.

There may also be a second backup central control system that runs con-currently with the first. If one central control system fails the backup automatically takes over.

One or more of the heat sensors, the pumps, the valves and the generators are analog devices that require small digital microprocessors to interface them to a digital network. The central control system may require the input of security data in order to operate, or alternatively may require the input of security data from a remote source in order to operate.

Pumps and valves may be installed at each well remote from the central control system so that each well can be individually controlled but can feed larger carrier pipes to deliver the hot fluid flows to the hot fluid reservoir and from the cold fluid reservoir.

It is to be understood that other embodiments may be utilized and structural and functional changes me be made without departing from the scope of the present invention. The foregoing descriptions of the embodiments of the invention have been presented for the purposes of illustration and description. It is not intended to be exhaustive or to limit the invention to the precise forms disclosed. Accordingly, many modifications and variations are possible in light of the above teachings. It is therefore intended that the scope of the invention not be limited by this detailed description.

The invention claimed is:

1. A control system that operates, manages and maximizes the conversion of heat to electricity from one or more individual geothermal wells configured in and surrounded by hot rock, comprising:

heat sensors for measuring temperature of a fluid flow in relation to one or more geothermal wells, a closed loop generating system in thermal communication with the one or more geothermal wells, a hot fluid reservoir included in the closed loop generating system, a cold fluid reservoir included in the closed loop generating system, and a cooling system coupled to a geothermal electric generation plant, including at top and bottom locations of the one or more geothermal wells;

a plurality of pumps and valves placed in the closed loop generating system for controlling a fluid flow rate of the fluid flow being extracted from the one or more geothermal wells;

a network for gathering information and delivering instructions to the heat sensors, pumps, valves, and generators included in one or more geothermal electric generation plants;

a system of rules and computations to control the closed loop generating system to extract heat from each geothermal well being substantially at or below a heat equilibrium rate that is determined by a point where the heat extracted from the hot rock substantially equals a heat replenishment rate of the hot rock; and the system of rules and computations also to optimize the hot fluid reservoir for power generation by measuring the temperature and fluid flows from all of the one or more geothermal wells couple to the hot fluid reservoir and adjusting a total capacity by blending into the hot fluid reservoir fluid from the cold fluid reservoir via a set of blending pipes included in the closed loop generating system connecting the hot fluid reservoir to the cold fluid reservoir, each well pumping fluid at a rate and a constant temperature that is determined by the heat equilibrium rate of each geothermal well, so that the heat of the hot fluid reservoir is a mixture of the heat from all of the wells and the temperature required for a generator to generate electricity is lower than the temperature in the hot fluid reservoir.

2. The control system of claim 1, wherein the control system is configured to attain the heat equilibrium rate of each geothermal well based at least partly by using the information from a heat sensor at a bottom of a heat nest that forms part of each geothermal well and a heat sensor at a top of the heat nest, and pump and valve control information that is sent to the control system, the control system sending control information for one or more pumps coupled to each well instructing the pumps to pump fluid into and out of each well at a certain fluid flow rate, wherein a fluid pumping rate determines an amount of heat being extracted from the well such that, when the fluid pumping rate reaches the heat equilibrium rate for each well, the control system stops increasing the fluid pumping rate, a respective heat equilibrium rate for each geothermal well being a respective point where associated heat extracted from associated hot rock equals a respective heat replenishment rate of the associated hot rock, each geothermal well being operated at or below the respective heat equilibrium rate, wherein the control system automatically adjusts the fluid pumping rate as conditions in the well change.

3. The control system of claim 1, wherein blending fluid from the cold fluid reservoir into the hot fluid reservoir increases a total flow capacity so that as the hot fluid reservoir reaches the temperature required by the generators more generators can be activated thereby creating more electricity.

4. The control system of claim 1, further comprising a plurality of pumps and valves placed in the cooling system, where the heat sensors, valve and pump control information from the cooling system are used to maintain a temperature differential between hot fluid and cooling system fluid, wherein sensors in the control system can send control information to the pumps and valves so enough cold fluid can be supplied to maintain the temperature differential.

5. The control system of claim 1, wherein the temperature of fluid in the cold fluid reservoir is high enough to activate generators so that the cold fluid reservoir becomes a hot fluid reservoir for another set of generators thereby cascading systems activating more generators and generating more electricity.

6. The control system of claim 1, wherein one or more respective geothermal wells can be taken off-line and rested by cycling fluid coming up from the one or more respective geothermal wells immediately back down the one or more respective geothermal wells.

7. The control system of claim 1, wherein the information obtained from the heat sensors, pumps, valves and generators is used for operations, maintenance and fault detection.

8. The control system of claim 1, wherein the network is an analog network.

9. The control system of claim 1, wherein the network is a digital (TCPIP) network.

10. The control system of claim 1, wherein each component in the closed loop generating system has an address and can be polled for information.

11. The control system of claim 1, wherein each component in the closed loop generating system has an address and is displayed on an informational monitor establishing a visual user interface.

12. The control system of claim 1, wherein a user communicates with the central control system using a personal computer interface.

13. The control system of claim 12, wherein the control system comprises a personal computer interface that is at least one of a keyboard, a mouse, a voice recognition application, a touch screen, a stylus, a hand held controller, and a cell phone.

14. The control system of claim 1, wherein the control system communicates remotely with another control system that can have a higher authority.

15. The control system of claim 1, wherein the control system comprises a second backup central control system that runs concurrently with the control system.

16. The control system of claim 1, wherein one or more of the heat sensors, the pumps, the valves and the generators are analog devices that require small digital microprocessors to interface them to a digital network.

17. The control system of claim 1, wherein the control system requires the input of security data in order to operate.

18. The control system of claim 1, wherein the control system requires the input of security data from a remote source in order to operate.

19. The control system of claim 1, wherein the pumps and valves are installed at each geothermal well remote from the control system so that each geothermal well can be individually controlled but can feed larger carrier pipes to deliver hot fluid flows to the hot fluid reservoir and from the cold fluid reservoir.

20. The control system of claim 1, wherein the control system is further configured to send control information for one or more pumps coupled to the one or more geothermal wells instructing the one or more pumps configured to pump fluid into and out of the one or more geothermal wells at a respective certain rate.

21. The control system of claim 1, wherein a fluid pumping rate determines an amount of heat being extracted from the at least one geothermal well such that when the fluid pumping rate reaches a heat equilibrium for the at least one geothermal well, the control system is configured to stop increasing the fluid pumping rate.

22. The control system of claim 21, wherein the at least one geothermal well is operated at or below heat equilibrium and the control system is configured to automatically adjust the fluid pumping rate as conditions in the at least one geothermal well change.

* * * * *

UNITED STATES PATENT AND TRADEMARK OFFICE
CERTIFICATE OF CORRECTION

PATENT NO.       : 8,534,069 B2
APPLICATION NO.  : 12/462656
DATED            : September 17, 2013
INVENTOR(S)      : Parrella It is certified that error appears in the above-identified patent and that said Letters Patent is hereby corrected as shown below:

On the Title Page, Item [56] Insert

--Rybach, Ladislaus, "Geothermal Sustainability," GHC Bulletin, September 2007, pages 2-7.--
--Sanyal, Subir K. and Butler, Steven J., "An Analysis of Power Generation Prospects from Enhanced Geothermal Systems," Proceedings World Geothermal Congress 2005, April 24-29, 2005, pages 1-6.--

In the Claims

In column 9 at line 49, claim 1, "couple" should be --coupled--

Signed and Sealed this
Twenty-fourth Day of June, 2014

Michelle K. Lee
*Deputy Director of the United States Patent and Trademark Office*